Oct. 21, 1924.
P. L. ANDERSON
REEL
Filed May 19, 1924
1,512,188
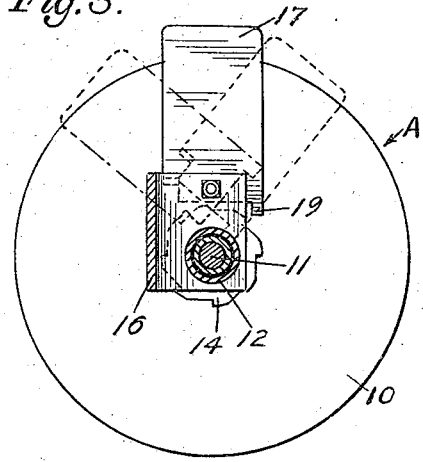
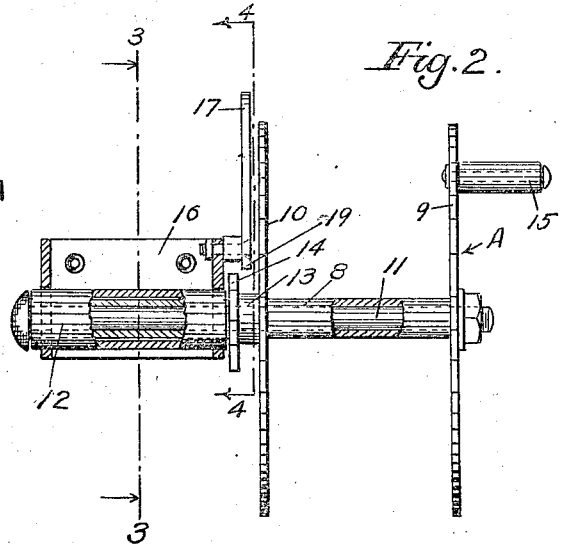
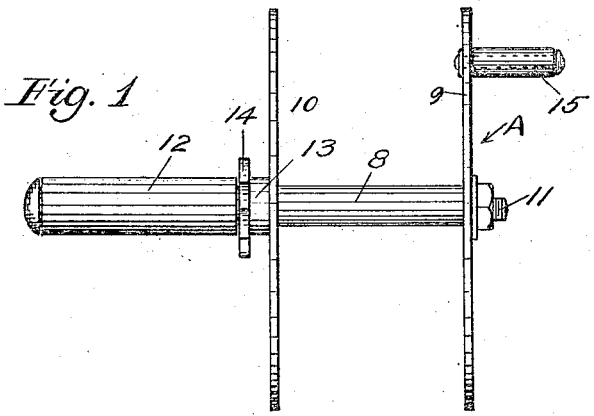
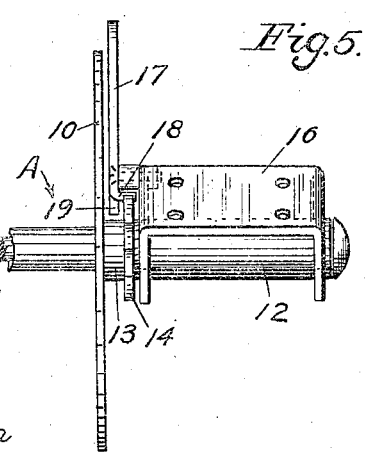
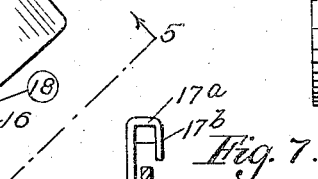
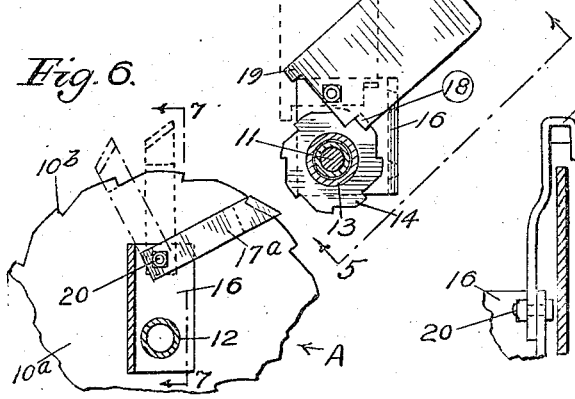
INVENTOR
PALMER L. ANDERSON
BY
ATTORNEY Patented Oct. 21, 1924.

1,512,188

UNITED STATES PATENT OFFICE.

PALMER L. ANDERSON, OF MINNEAPOLIS, MINNESOTA.

REEL.

Application filed May 19, 1924. Serial No. 714,465.

*To all whom it may concern:*

Be it known that I, PALMER L. ANDERSON, a citizen of the United States, residing at Minneapolis, in the county of Hennepin and State of Minnesota, have invented certain new and useful Improvements in Reels, of which the following is a specification.

This invention relates to reels for clothes lines and the like, and the main object is to provide a simple, practical and efficient reel which may either be held in the hand during the winding or unwinding operation, or is detachable with respect to a fixed bracket member so that it may also be operated while secured thereto. Further and more specific objects will be disclosed in the course of the following specification, reference being had to the accompanying drawing, in which:

Fig. 1 is an elevation of the reel, as seen when in its detached position.

Fig. 2 is an elevation of the reel showing it in place with respect to the supporting bracket, fractional portions being broken away.

Fig. 3 is a sectional elevation on the line 3—3 in Fig. 2.

Fig. 4 is a sectional view on the line 4—4 in Fig. 2, showing the latch dog or pawl in its operative or tilted position.

Fig. 5 is an elevation of the device as seen when looking in the direction of the arrows 5—5 in Fig. 4.

Fig. 6 is a detail view similar to the upper portion of Fig. 3, showing a modification in the latch or pawl mechanism.

Fig. 7 is a sectional detail on the line 7—7 in Fig. 6.

Referring to the drawing more particularly and by reference characters, A designates a reel or spool consisting of a hollow core 8 which rigidly connects a pair of side plates 9 and 10, between which and upon the core is wound the clothes line (not shown). A bolt 11 extends through the core 8 and also through a hollow handle 12, so that the handle will be rotatable upon the bolt. Intermediate the handle 12 and the reel A is a short sleeve 13 having a ratchet pinion 14, the member 13—14 being rigid with the reel. The reel is also provided, at the opposite side from the member 13—14, with a turning handle 15.

A substantially U-shaped bracket 16, which is rigidly secured to any suitable support such as a clothes post or building, is provided with a pair of apertures adapted to slidably receive the handle 12. At one end of the bracket 16 is pivotally secured a lever member 17, which is also spaced slightly away from the bracket (Figs. 2 and 5) so that it may engage over the ratchet pinion 14 and down upon the sleeve 13, as in Figs. 3 and 4. When the lever 17 is in a vertical position over its swinging center it is so arranged as to allow or permit the pinion 14 to be moved into or out of its operating position, but when the lever drops to either side, as indicated by the dotted lines in Fig. 3, it engages behind the pinion 14, and prevents the reel from being removed from the bracket. The lever is provided with an angular projection or pawl 18, which, when the lever is dropped in the position shown in Figs. 4 and 5, engages the ratchet pinion 14 and prevents it from turning in but one direction. The lever is also provided with an extension 19 at its other side, which, when the lever is dropped in that direction stops on the sleeve 13, and thus permits the reel to be turned in either direction, but still engages back of the ratchet to prevent the removal of the reel. It will thus be seen that the reel can only be removed when the lever 17 has been raised to a vertical position, as in Figs. 2 and 3.

The operation of the device shown in Figs. 1, 2, 3, 4 and 5 may be briefly described as follows:

It is obvious that with the reel detached as in Fig. 1, the operator may hold the handle 12 in one hand and with the other hand may turn the handle 15 so as to either wind up or unwind the line. It is particularly useful in this way when the line is fastened at intervals to alternately spaced hooks, so that the operator may walk from one hook to another and wind up or unwind the line as he walks. Open pulleys are frequently substituted for such hooks, however, and in this event the line is only fastened at one end, the other end being secured to the reel which is then mounted in the bracket 16. The line is then pulled out and looped over as many pulleys as desired, the pawl lever 17 being thrown over, as to the right in Fig. 3, so that the line may be freely reeled out. The pawl is then moved over to the opposite side so as to engage the ratchet 14. The reel is now wound up until the line is stretched as tight as necessary, in which position it is held until the clothes have been dried and the line is again to be reeled up. If the line should sag during the drying process it is obvious that it may be reeled up tighter at any time.

In the modication shown in Figs. 4 and 6, the pawl 17$^a$ is pivoted as at 20 to the bracket 16, but instead of operating on a pawl ratchet, as 14, it engages with its outer end over the periphery of the reel plate 10$^a$ which is provided with ratchet teeth 10$^b$. In this instance the pawl is provided with an integral overhanging hook 17$^b$ which retains the reel in position either when the teeth are engaged or when the pawl is in the inactive position indicated by the dotted lines shown at the right in Fig. 6. When the reel is to be removed the pawl is held in the vertical position shown in Fig. 7.

It is understood that suitable modifications may be made in the structural details of the device as herein disclosed, provided, however, that such modifications come within the spirit and scope of the appended claims. Having now therefore fully shown and described my invention, what I claim to be new and desire to protect by Letters Patent is:

1. The combination including a reel adapted to contain a clothes line or the like, a handle projecting axially from the reel and rotatable with respect thereto, a supporting member adapted to be engaged by said handle to mount the reel, and a ratchet mechanism co-operating with the reel, to prevent rotation of the same in one direction.

2. The combination including a reel, a handle projecting axially from the reel and rotatable with respect thereto, a supporting member adapted to be engaged by said handle to mount the reel, a ratchet mechanism adapted to prevent rotation of the reel, and said ratchet mechanism being arranged to detachably retain the reel adjacent to the supporting member.

3. A device of the class described consisting of a reel having a ratchet member for optionally preventing rotation thereof in one direction, and a handle by which the reel is carried; a stationary bracket adapted to detachably receive the handle so as to rotatably secure the reel, and a second ratchet member mounted on the bracket for co-operating engagement with the first mentioned ratchet member.

4. A device of the class described consisting of a reel having an axially extending handle, a bracket member adapted to receive the handle to rotatably support the reel, means for detachably retaining the handle in the bracket member, and a ratchet mechanism adapted to prevent rotation of the reel in one direction.

5. A device of the class described consisting of a reel having an axially extending supporting handle and a turning handle, ratchet teeth rigidly arranged with respect to the reel, a bracket member having apertures adapted to slidably receive said supporting handle to mount the reel, a pawl member pivotally secured to the bracket member so as to co-operate with the ratchet teeth when the reel has been mounted to prevent rotation of the reel in one direction, and means including said pawl member for detachably retaining the supporting handle in the bracket member.

In testimony whereof I affix my signature.

PALMER L. ANDERSON.